Aug. 12, 1969 J. W. MOTTO, JR., ET AL 3,461,319
SECONDARY SLAVE CONTROL FOR SERIES-CONNECTED GATE CONTROLLED SWITCHES
Filed Feb. 24, 1967
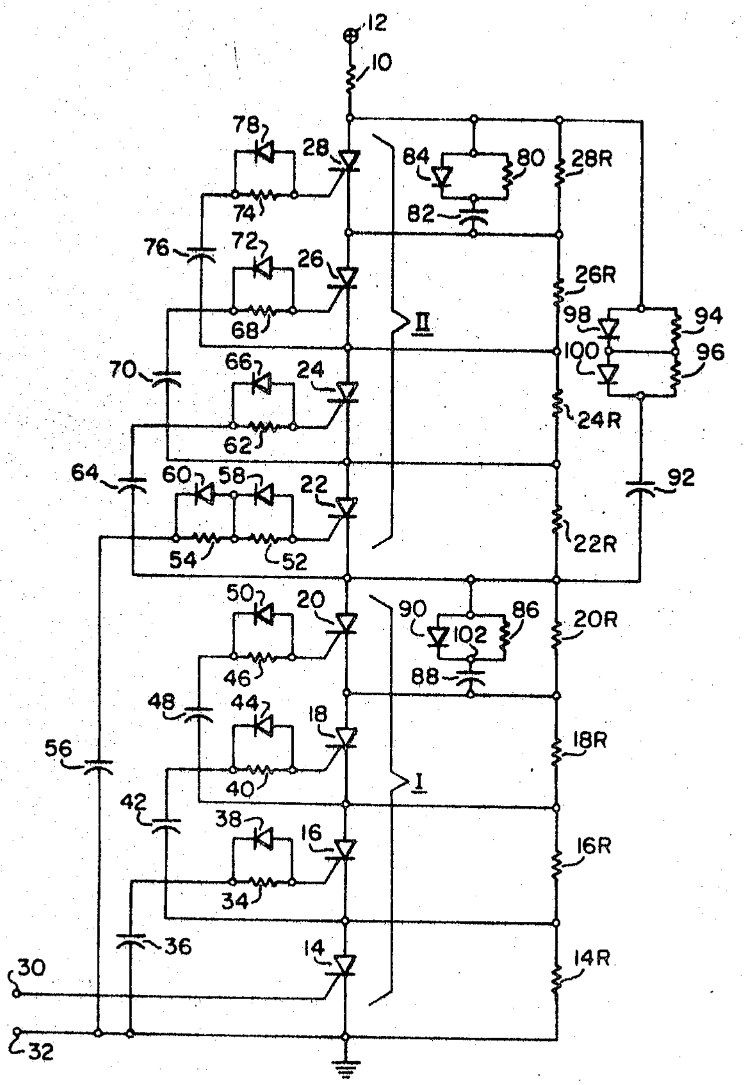
WITNESSES:
Bernard R. Gieguez
James F. Young
INVENTORS
John W. Motto, Jr., Warren C. Fry
and Ralph A. Prunty.
BY
C. L. Menzemer
ATTORNEY

United States Patent Office 3,461,319
Patented Aug. 12, 1969

3,461,319

SECONDARY SLAVE CONTROL FOR SERIES-CONNECTED GATE CONTROLLED SWITCHES

John W. Motto, Jr., Greensburg, Warren C. Fry, Connellsville, and Ralph A. Prunty, Greensburg, Pa., assignors to Westinghouse Electric Corporation, Pittsburgh, Pa., a corporation of Pennsylvania Filed Feb. 24, 1967, Ser. No. 618,451
Int. Cl. H03k *17/04*
U.S. Cl. 307—252 7 Claims

ABSTRACT OF THE DISCLOSURE

This invention relates to semiconductor switching circuitry employing thyristors. More particularly, the invention relates to secondary slave control circuitry for series-connected thyristors capable of controlling high voltage direct current power wherein the thyristors are operated as a plurality of modules of thyristors, each module having a master thyristor which is turned on or off in synchronism with the other master thyristors in the series string. Turn-on of the master thyristor in each module, for example, immediately initiates sequential turn-on of the other thyristors in its associated module such that turn-on of all thyristors in the string is achieved much more rapidly, enabling the number of thyristors in a series string to ge greatly increased.

Summary of invention

In general, thyristor devices can be broken down into two types, namely, silicon controlled rectifiers and gate controlled switches. The silicon controlled rectifier is an NPNP four-layer device similar in operation to a thyratron. That is, once it is triggered into conduction by application of a potential to its gate electrode, it can be turned off only by a reduction in anode potential.

The gate controlled switch is also a solid-state semiconductor NPNP four-layer device somewhat similar to the silicon controlled rectifier in that it has all the basic features of the silicon controlled rectifier. However, in contrast to the silicon controlled rectifier, the gate controlled switch does not lose control after the device has been rendered conductive. Rather, the gate controlled switch can turn off the load current by applying a reverse pulse of relatively small magnitude to its gate electrode. It is somewhat similar to a switching transistor in performance, except that is does not require a continuous control current to maintain the conduction state. The gate controlled switch essentially combines the desirable features of both switching transistors and silicon controlled rectifiers.

It has been demonstrated that slave control of the turn-on actions of thyristors can be realized. In such a slave control system, capacitors are employed which momentarily couple turn-on pulses in sequence to series-connected thyristors after one master thyristor is turned on; and, in the case of gate controlled switches, these same capacitors are utilized to couple turn-off pulses in sequence to the series devices when the master unit is initially switched off. In such an arrangement, a capacitor is connected between the cathode of a lower unit in the series string and the gate electrode of the next succeeding unit such that when the lower unit is switched on, the capacitor will discharge through the gate electrode of the upper or next succeeding unit to switch it on. This procedure is repeated along the string such that the units are turned on sequentially starting from the bottom of the string and progressing sequentially upwardly until all of the units have been turned on in sequence.

This successive turn-on occurs very rapidly, and the minute time delay between units does not create an excessive voltage on the latter units to turn on since the shunt capacitors connectors between the cathodes and gate electrodes of successive units will not permit the voltage to change appreciably during this small time increment. Similarly, the sequential turn-off action of gate controlled switches is also very rapid, and the minute time delay between units does not create an excessive voltage across the first units to turn off since the shunt capacitors will not permit the voltage to change appreciably in this small time increment.

While slave control systems employing shunt capacitors of the type described above have been used successfully for series-connected thyristors, there is a limitation in the number of thyristors that can be controlled with the method. This limitation is a result of the additional blocking voltage required of the thyristor units that turn-off first or turn-on last in the series string. That is, the capacitors connected in parallel with the first units to switch off will have additional time to charge and will reach a higher voltage than units which switch off at a later time. The opposite is true for turn-on. This additional time increases with the number of units in series, making the required blocking voltage of the units which turn-off first and turn-on last excessively high.

This voltage gradient problem can be reduced by a capacitance gradient wherein larger capacitors are employed in the stages which turn-off first or turn-on last. However, while a capacitance gradient of this type will improve the voltage gradient, it is again limited to probably ten stages since the capacitance values become large and the tolerances close.

As an overall object, the present invention provides slave control gating circuitry for series-connected thyristors wherein the number of thyristors in series can be greatly increased over previous slave control systems.

Another object of the invention is to provide a secondary slave control system for series-connected thyristors wherein the thyristors are operated as a plurality of modules of thyristors, each module having a master thyristor which is turned on or off in synchronism with the master thyristors of the other modules in the string.

Still another object of the invention is to provide a switching circuit employing series-connected gate controlled switches which are controlled by a slave action wherein the turn-on and turn-off of a master unit controls the turn-on and turn-off of other series-connected devices.

The above and other objects and features of the invention will become apparent from the following detailed description taken in connection with the accompanying single figure drawing which schematically illustrates one embodiment of the invention utilizing gate controlled switches.

Referring now to the drawing, a plurality of gate controlled switches are connected in series with a load resistor 10 between ground and a source of high positive potential identified by the reference numeral 12. It should be understood that the gate controlled switches utilized in the particular embodiment of the invention shown herein could be readily replaced by semiconductive controlled rectifiers. Of course, if the controlled rectifiers are employed, the turn-off action about to be described will not apply since turn-off of the rectifiers can be achieved only by a reduction in anode potential. As an illustrative example, the voltage applied across the series-connected gate controlled switches may be 3.2 kilovolts. The series-connected gate controlled switches are divided into two groups or modules identified as Module I and Module II. Module I, for example, includes series-connected gate controlled switches 14, 16, 18 and 20; while Module II includes gate controlled switches 22, 24, 26 and 28. Coupled across the gate controlled switches 14 through 28 is a voltage divider network comprising resistors 14R through 28R, each resistor having connections such that it is shunted across its associated gate controlled switch. Thus, resistor 14R is in shunt with gate controlled switch 14; resistor 16R is in shunt with gate controlled switch 16; resistor 18R is in shunt with gate controlled switch 18; and so on. A pair of input terminals 30 and 32 is connected to the gate controlled switch 14 such that terminal 30 is connected to the gate electrode of switch 14 while terminal 32 is connected to the cathode of switch 14 and, hence, ground.

A circuit including resistor 34 and capacitor 36 in series is connected between the gate of switch 16 and the cathode of switch 14. In shunt with the resistor 34 is a diode 38 poled so as to permit current flow therethrough when the gate of switch 16 is positive with respect to ground. In a similar manner, a circuit comprising resistor 40, capacitor 42 and diode 44 is connected between the gate of switch 18 and the cathode of switch 16; while a circuit including resistor 46, capacitor 48 and diode 50 is connected between the gate of switch 20 and the cathode of switch 18.

As can be seen, the gate controlled switch 20 is the last switch in the lower module I. The next gate controlled switch 22 in the series string, comprising the master switch in the second module II, has its gate electrode connected to ground through resistors 52 and 54 in series with a capacitor 56. In shunt with the resistors 52 and 54 are diodes 58 and 60, respectively. It will be noted that the circuit connected to the gate of switch 22 is similar to that connected to the gate of switch 16. However, there are several important differences. First, the capacitance value of capacitor 56 is much less than that of capacitor 36, specifically on the order of about one-fifth that of capacitor 36. Secondly, the cumulative value of resistors 52 and 54 is over four times that of any one of the individual resistors 34, 40 or 46. The purpose for this will be explained hereinafter.

Taking, now, the second gate controlled switch 24 in module II, its gate electrode is connected to the cathode of switch 22 through a circuit including resistor 62, capacitor 64 and diode 66. Similarly, the gate electrode of switch 26 in module II is connected to the cathode of switch 24 through a circuit including resistor 68, capacitor 70 and diode 72; while the gate of switch 28 is connected to the cathode of switch 26 through a circuit including resistor 74, capacitor 76 and diode 78. The values of resistors 62, 68 and 74 correspond to those of resistors 34, 40 and 46. That is, their resistance values are all approximately one-fourth the total cumulative resistance value of resistors 52 and 54 in series.

Connected across the anode and cathode electrodes of the gate controlled switch 28 is a circuit combination comprising a resistance 80 in series with a capacitor 82. Connected across the resistance 80 is a diode 84 poled so as to permit current flow therethrough when a positive potential is applied to terminal 12. A similar circuit combination is connected between the anode and cathode of the last gate controlled switch 20 in the lower module I. Thus, a resistor 86 is connected in series with capacitor 88 across the anode and cathode of switch 20, the resistor 86 being in shunt with a diode 90 poled to conduct current in the same direction as switch 20. The circuit is completed by a capacitor 92 in series with resistors 94 and 96, each resistor being in shunt with a diode 98 or 100, respectively. The circuit just described is connected to the cathode of the first or master gate controlled switch of the second module II and, like the circuit connected to the gate of switch 20, includes capacitor 92 having the same capacitance value as capacitor 56 and resistors 94 and 96 having the same resistance values as resistors 52 and 54.

Representative values of the aforesaid circuit components may be as follows:

Voltage at terminal 12—+3.2 kv.
Resistor 10—500 ohms
Resistors 14R through 28R—each 300,000 ohms
Resistors 34, 40, 46, 62, 68, 74, 80 and 86—220 ohms
Resistors 52, 54, 94 and 96—470 ohms
Capacitors 36, 42, 48, 64, 76, 82 and 88—0.05 microfarad
Capacitors 56 and 92—0.011 microfarad When the circuit is first energized, the supply voltage will divide equally across the gate controlled switches 14 through 28 due to resistors 14R through 28R, all of which are equal in value. Likewise, the capacitors 36, 42, 48, 64, 70 and 76 will charge to voltages equal to that across associated ones of the resistors 14R through 28R. The capacitor 56, however, will charge to a voltage equal to that across all resistors 14R, 16R, 18R and 20R. The voltage drop across the load resistor 10 and resistor 80 is negligible since their combined value is substantially less than the combined value of resistors 14R through 28R.

The switching action of the lower module I will be considered first. When a positive pulse is applied to the terminals 30 and 32 from a control pulse source, not shown, the gate controlled switch 14, comprising the master gate control switch for the lower module I, will turn on. When this occurs, switch 14 is capable of supporting current flow in either direction through its anode-to-cathode junction. Since capacitor 36, through the gate of switch 16, is connected in shunt with the gate controlled switch 14, it will now discharge through switch 14, causing switch 16 to conduct. In a similar manner, when switch 16 conducts, capacitor 42 discharges through switch 16 to turn on switch 18; and when switch 18 turns on, capacitor 48 will discharge to turn on the switch 20.

If the voltage gradient across the series string is 3,200 volts, this will be divided equally across resistors 14R through 28R, assuming that none of the gate controlled switches 14 through 28 are conducting. Thus, before the turn-on pulse is applied to terminals 30 and 32, a voltage of 400 volts will appear across each resistor 14R through 28R. Resistor 86 is much smaller in magnitude than resistor 20R, resistor 20R being over one-thousand times larger. Consequently, almost the entire 400 volts appearing across resistor 20R will also appear across capacitor 88.

When a turn-on pulse is applied to the input terminals 30 and 32 and the master gate controlled switch 14 of module I turns on, the resistor 14R is, in effect, shorted such that the total of 3,200 volts is now divided among resistors 16R through 28R. Consequently, the voltage at point 102 will now rise in a positive direction, and this voltage will be applied via resistor 86 to the cathode of the master gate controlled switch 22 in the second module II. The capacitor 56, being originally charged to a higher positive potential than that now existing at point 102, will discharge through the gate of switch 22 and into the capacitor 88, thereby causing the switch 22 to turn on at the same time that switch 16 turns on.

The remaining action in the module II is the same as that in module I. That is, when the master gate controlled switch 22 in module II turns on, capacitor 64 discharges through the gate of switch 24 to turn it on. When switch 24 turns on, the capacitor 70 discharges through the gate of switch 26; and when switch 26 turns on, a capacitor 76 discharges through the gate of switch 28 to turn it on. Thus, switches 16 and 22 turn on essentially simultaneously; switches 18 and 24 turn on essentially simultaneously; and switches 20 and 26 turn on essentially simultaneously. Switch 28, of course, is the last to turn on.

It will be immediately apparent that with this type of secondary slave control, the sequential turn-on of the gate controlled switches occurs more rapidly than would be the case, for example, if all of the switches had to turn on one after the other in the entire string. At the same time, the voltage differential across the various capacitors is materially reduced.

When a negative turn-off pulse is applied to the input terminals 30 and 32, the gate controlled switch 14 will turn off, whereby the major portion of the supply voltage will appear across resistor 14R since the value of resistor 14R is much greater than that of the load resistor 10. When gate controlled switch 14 turns off, capacitor 36 will begin to charge to the voltage across resistor 14R. The charging current of capacitor 36 will pass out of the gate of the second gate controlled switch 16, switching this latter switch into the blocking state. When switch 16 turns off, capacitor 42 charges through the gate of switch 18, causing it to turn off; and when switch 18 turn off, capacitor 48 charges through the gate of switch 20 to turn it off. As in the turn-on process, the sequential action is very rapid such that the capacitors will not permit an excessive voltage build up across any one gate controlled switch.

When gate controlled switch 14 turned off, and assuming that the load current was about 5 amperes, a rate of rise of voltage of 100 volts per microsecond occurs at the anode of switch 14. Since gate controlled switches 16, 18 and 20 are all in the conducting state at this time, the rate of rise of voltage also occurs at the gate of gate controlled switch 22, the master unit of the second module II. Since the rate of rise of voltage occurs at the gate of switch 22, capacitor 56 starts to charge up, thereby turning off the gate controlled switch 22. When switch 22 turns off, the turn-off action is propagated upwardly by successive charging of capacitors 64, 70 and 76 until all of the gate controlled switches in the second module II are turned off along with those in the first module I.

As was mentioned above, the capacitance of capacitor 56 is about one-fifth that of capacitors 36, 42 and 48 in module I and capacitors 64, 70 and 76 in module II. The reason for this is that since capacitor 56 is connected across four of the resistors 14R, 16R, 18R and 20R, it will be charged to a much higher voltage than any one of the other capacitors 36, 42 or 48, for example. If capacitor 56 were of the same value as the other capacitors in the circuit, therefore, it would store an excessively high amount of energy which would have to pass through the gate electrode of switch 22 in module II, possibly causing damage to the switch. The higher values of resistors 52 and 54 also help to reduce the surge of current through the gate of switch 22.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In a slave control system for series-connected thyristors, the combination of at least two series-connected modules of thyristors, each module containing a master thyristor in series with a plurality of remaining thyristors, each of said thyristors having an anode, cathode and gate electrode, the anode of the last of said remaining thyristors in the first module being connected to the cathode of the master thyristor in the second module, a plurality of resistors each of which is connected in shunt with an associated one of said thyristors in a voltage divider arrangement, input terminals connected to the gate electrode and cathode of the master thyristor in said first module for applying a master control pulse thereto, means including a plurality of capacitor elements connecting the cathodes of all but the last thyristor in said second module to the gate electrode of a next successive thyristor in the series string whereby the thyristors in each module will be turned on in sequence after the master thyristor for that module is turned on, means including a first capacitor coupling the cathode of the master thyristor in said first module to the gate electrode of the master thyristor in said second module, and means including a second capacitor connected in shunt with said last thyristor in said first module, whereby turn-on of the master thyristor in said first module will cause said first capacitor to discharge through the gate electrode of the master thyristor in said second module and into said second capacitor with the thyristors in said second module turning on in sequence at the same time that the thyristors in said first module are turning on in sequence.

2. The control system of claim 1 wherein said first capacitor has a lower capacitance value than said second capacitor and said plurality of capacitor elements.

3. The control system of claim 2 wherein said capacitor elements and said first and second capacitors are each connected in series with a resistor, the resistor being connected in parallel with a unidirectional current device.

4. The control system of claim 2 including a third capacitor connecting the cathode of the master thyristor in said second module to the anode of the last of the remaining thyristors in said second module, said third capacitor having a capacitance value substantially equal to the capacitance value of said first capacitor.

5. The control system of claim 1 including a load impedance and a source of driving potential connected in series with said series-connected modules, the cathode of the master thyristor in said first module being connected to the negative terminal of said source of driving potential.

6. The control system of claim 1 wherein the thyristors comprise semi-conductive controlled rectifiers.

7. The control system of claim 1 wherein the thyristors comprise gate controlled switches which are turned on in response to a master control pulse of one polarity and turned off in response to a master control switch of the opposite polarity.

References Cited

UNITED STATES PATENTS

| | | | |
|---|---|---|---|
| 3,158,799 | 11/1964 | Kelley et al. | 307—252 X |
| 3,254,236 | 5/1966 | Meng | 307—252 |
| 3,267,290 | 8/1966 | Diebold | 307—284 X |
| 3,287,576 | 11/1966 | Motto | 307—284 X |

JOHN S. HEYMAN, Primary Examiner

U.S. Cl. X.R.

307—284